May 15, 1928.  1,669,831
C. KULAS
METHOD OF PRODUCING ARTIFICIAL RESIN
Filed Oct. 16, 1925
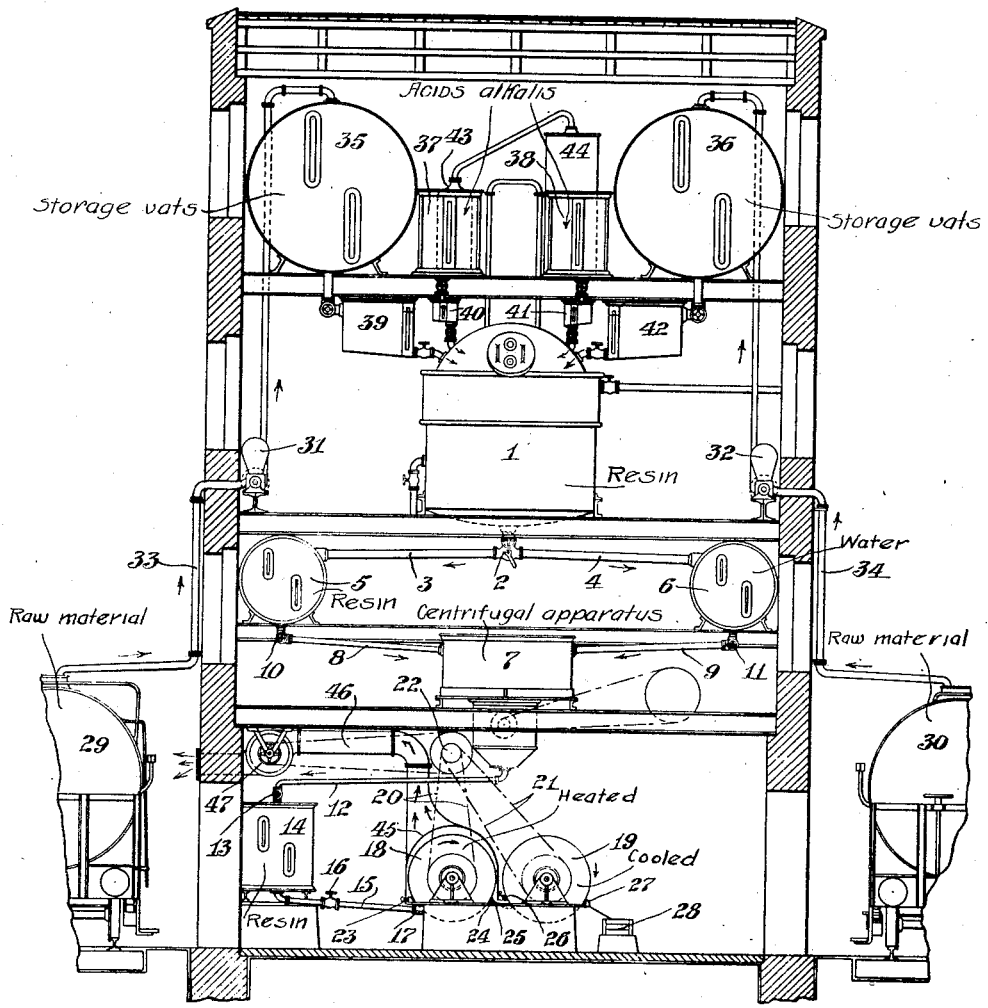
Inventor
Carl Kulas
By his Attorney Patented May 15, 1928.

1,669,831

UNITED STATES PATENT OFFICE.

CARL KULAS, OF LEIPZIG, GERMANY.

METHOD OF PRODUCING ARTIFICIAL RESIN.

Application filed October 16, 1925. Serial No. 62,826.

My invention relates to a method of manufacturing artificial resin from such constituents as phenolic-formaldehyde condensation products, tar, crude tar oils, crude methyls $CH_3OH$ and the like.

The principal object of my invention is to provide a continuous method, for producing artificial resin in sheet or leaf form, especially suitable for preparing shellac or lacquer.

Briefly stated, the method consists in reacting the constituents of the resin in the presence of heat, then cooling and settling to bring about the formation of a stratum of tacky resin and a liquid stratum, subjecting the tacky resin stratum to a cold liquid removal action, preferably centrifugally, thereupon subjecting the partially dehydrated resin to an evaporating and concentrating action, preferably by rapid motion on the periphery of a heated drum, and finally cooling and setting the resin, desirably on the periphery of a cooled drum, whence it is removed in desired leaf or sheet form. The liquid stratum may have its resin content drawn off and subjected to the treatment described above with respect to the tacky resin stratum.

The preferred apparatus for practicing the method includes a reaction vessel, tanks into which the resin stratum and liquid stratum are respectively drawn, a centrifugal apparatus with which the tanks communicate, and a battery of rotary drums, hot and cool, to which the product successively passes. Suitable means are provided for regulating the thickness of the layer of material taken up by the drums, and for stripping the product from the drums.

Artificial resin is usually placed on the market in the form of blocks, pieces, grains or powder. In the manufacture of the resin, the constituents, which usually consist of phenol-formaldehyde with or without reaction accelerators and with or without the addition of natural or artificial resin, are combined in a closed cooking (or boiling) and distilling apparatus. The liquid which separates out is removed by distillation from the resin stratum, and the latter which is substantially free of liquid and contains but traces of impurities, is discharged into cooling pans or other similar receptacles. The resin thus produced, after cooling and setting, is generally in the form of blocks or large pieces, and to render it available for use as a lacquer or shellac, so as to be soluble in the usual artificial resin solvents, the blocks or pieces must undergo a time consuming comminuting and pulverizing action which causes very considerable mechanical difficulty.

The comminuting and pulverizing action is particularly difficult in the case of resits, i. e., those artificial resins which by reason of their insolube and unmeltable final condition are extremely susceptible to heat. The melting point of the resit in its resol stage is ordinarily very low (about 50 degrees Celsius), and in the resol stage these products tend to become sticky or tacky as the result of the frictional heat developed by the guiding or comminuting mechanism. As a consequence of the increased temperature the resol undesirably changes its chemical condition by the further reaction of the constituents, being converted into the resitol or resit stage, in which it gums the grinding mechanism and causes stoppage thereof. The necessary consequences are loss of time, material and money.

The process ordinarily employed for melting natural resins is not applicable to artificial resins because, despite their otherwise highly desirable properties, they are subject to chemical changes in the presence of heat, i. e., they are changed into resitol and resit, which can only be treated in small quantities without substantial loss, and become practically useless if it be attempted to treat large quantities at a time.

The production methods heretofore employed were always of an intermittent, very limited, character, in that the quantities of constituents necessary to produce a given quantity of final product were placed into the reaction vessel, and upon completion of the product all the steps of the method were necessarily repeated if a new quantity of resin was to be produced.

By the use of the installation, shown schematically in the accompanying drawing, artificial resin may be produced by an automatic, continuous method.

The required quantities of raw materials for producing a given yield and quality of artificial resin are placed into the reaction vesel 1 which is subjected to heat until the desired reaction has taken place. After completion of the reaction the contents of the vessel are permitted to stand and cool until they separate into two strata. The upper watery stratum is substantially free of resin, while the lower stratum consists of tacky resin (resol or novolack dependent upon the character of the constituents employed) containing about 15 to 20 percentum of liquid.

The bottom of the vessel 1 is provided with valve mechanism 2 which controls the inflow of the contents of the vessel 1 into pipes 3 and 4 leading, respectively, to the tanks or receptacles 5 and 6. The resin stratum is drawn from vessel 1 through pipe 3 to the tank 5 and the watery stratum is drawn into the tank 6. If desired, the vessel 1 may be recharged with a new supply of resin constitutents, and the latter boiled and caused to react in the same manner as the preceding charge. While the reaction is progressing the other phases of the method are taking place, and the method is thus a continuous one in the true sense of the term.

The tanks 5 and 6 are connected to a centrifugal apparatus 7 by means of pipes 8 and 9, controlled by the valves 10 and 11, respectively. The centrifugal apparatus 7 may be of any approved type. The tacky resin is conducted from tank 5 to the centrifugal apparatus 7 where it is freed, by cold centrifugal action, of about 10 percentum of its liquid content.

Leading from the bottom of the centrifugal apparatus 7 is a pipe 12 which communicates, through a valve 13, with a receiving vat 14 through its upper wall. The resin, after treatment in the centrifugal apparatus 7, passes from the latter through the pipe 12 into the vat 14.

The resin next passes to a battery of hot and cold drums, to be vaporized, concentrated, cooled and set. A plurality of both hot and cold drums may be employed, but in the drawing I have shown but one hot and one cold drum as these will suffice to make the principle of the invention clear.

Connected to the base of the vat 14 is a pipe 15, having a valve 16 therein, said pipe communicating with a trough 17 which is closely juxtaposed to and extends along the entire width of the periphery of a heated drum 18. The drum 18 which is made of metal, such as iron, copper, nickel, aluminum or the like, is hollow and is so constructed as to be heated interiorly or exteriorly by suitable means (not shown). Adjacent to, but spaced from the drum 18, with its shaft parallel to that of the drum 18, is a second hollow, metallic drum 19, which may be interiorly or exteriorly cooled by suitable means (not shown). The drums are rotated by means of belts 20 and 21 from a power shaft 22.

The resin from vat 14 passes through pipe 15 into the trough 17 to be taken up by the periphery of the heated drum 18 and to be carried around thereon. For artificial resins which are not susceptible to heat, i. e., those which behave like natural resins, such as novolack and other permanently soluble artificial resins, the battery of drums need consist of but one heated drum and one cooled drum, but for the production of resits it is advantageous to employ a series of heated drums, the number used depending on the character and quantity of the product being manufactured, and if desired the drums may be graduated as to temperature. Ordinarily but one cooling drum is necessary, irrespective of the number of heating drums which are used.

Arranged immediately above the trough 17 is a doctor blade 23, adjustable toward and from the periphery of the drum 18, whereby the thickness of the layer of resin taken up by the drum 18 may be regulated. Closely adjacent the drum 18 at what may be termed its discharge side, opposite the blade 23, is a fixed blade or stripper 24 the function of which is to remove from the drum the resin adhering thereto. This resin falls into a trough 25 between and in immediate proximity to both drums 18 and 19. Above the trough 25 is an adjustable doctor blade 26 to regulate the thickness of the layer of resin taken up on the periphery of the cooling drum 19, and at the discharge side of drum 19, opposite the blade 26 is a fixed blade or stripper 27 to remove from the periphery of drum 19 the resin which has by this time cooled and set.

The blades 23, 24, 26 and 27 are the full width of the drums 18 and 19 and act across the entire transverse peripheral surfaces thereof. When the resin reaches the blade 27 it is stripped from the drum in sheets of any desired thinness, and usually comes off in the form of scales or leaves, which fall into the receptacle 28 whence they may be conveyed to the packing and shipping room, or to any other desired place.

By permitting the contents of the tank 6 to stand for a proper length of time a certain quantity of resin will settle which may be passed through the several stages of the method described with respect to the resin in tank 5. To the liquid which remains in tank 5 I add new quantities of raw materials, and then conduct the mass to the reaction vessel 1 to be used anew. After having been used twice the liquid from tank 5 is discharged as not further usable.

The drawing shows a complete operating installation, and in addition to the parts heretofore described, the installation also desirably includes the following:—Tank cars 29 and 30 in which the raw materials are conveyed to the plant; pumps 31 and 32 by means of which the raw materials are raised from the tank cars through the pipes 33 and 34 into the storage vats 35 and 36; storage tanks 37 and 38 for acids, alkalis etc., measuring means 39 to 42 for regulating the flow of raw materials, acids and alkalis into the reaction vessel 1; a foam catcher 43 for vessel 1, and a reflux cooler 44 for vessel 1.

The heated drums (drum 18 in the drawing) are preferably covered by a housing 45 connected by a pipe 46 with an exhaust fan 47 which draws off the fumes or vapors which may be condensed and used as or converted into disinfectants and the like.

The invention, described above, has many advantages over existing practice and results in a notable improvement in the quality of the resin produced. According to present manufacturing methods, which are long and expensive, there is a complete lack of uniformity as to character and quality of the resulting product because close control of the process is impossible due to the long period of distillation and the large quantities of raw materials used. To operate economically by the old method, it was necessary to employ large quantities of raw materials which during distillation were very active and unruly, foamed violently and deposited resin on the cooling apparatus, so that because of the failure of proper cooling action excess pressure and spontaneous heating of the resin occurred. These conditions became particularly dangerous shortly before completion of the distillation process, because at that stage the resols would shortly change into resitol or resit and would then be useless for the further steps of the process. By means of the present invention all losses of this kind are precluded, inasmuch as the entire procedure can be supervised very easily by a single skilled workman.

There need be no limit to the magnitude of operation, the output being merely dependent on the dimensions of the installation.

In the methods as heretofore practiced, the liquid residue was a source of considerable trouble and because of its content of small quantities of resin, phenol, formaldehyde, catalyst etc., its removal was difficult as well as entailing a loss of valuable material. According to my method, by which the liquid from tank 6 has its valuable contents extracted and is then reused, the trouble and loss in this respect are entirely eliminated.

A further very important advantage of my method lies in the fact that, in case of any operating disturbances or unavoidable stoppage of operation due to lack of power, light, steam or heat, the process may be stopped without any serious consequences by simply closing off the flow passages; the resulting product will not be detrimentally affected, and when the disturbance has ceased the process may quickly be resumed. This is in sharp distinction to present practice in which each operating disturbance during the distillation period was a source of danger to the workers and in most cases led to loss of material and injury to the mechanism.

The quality of the resinous product produced by the new method is much superior to that produced by other methods because the resin on the surface of the heated drums, in my method, can be subjected to much higher temperatures, without detriment, than a strongly reacting large body of resin (of several hundred pounds) in a closed distilling vessel, and also because the evaporation of the impurities in the mass is much more intense and thorough in my method than it is in a method employing a closed distilling vessel having a constantly decreasing vaporizing surface in relation to the entire body of resin.

It should also be noted that the artificial resin produced in accordance with my invention has a much higher melting point than a corresponding resin produced with the use of a closed distillation vessel. The odor of carbolic acid and formalin always present in resins of the old type is almost entirely absent from my product, due to the intense evaporating action to which the resin is subjected on the heated drum.

Furthermore, the caking and sticking at ordinary room temperature, so prevalent in resins heretofore manufactured is entirely eliminated in my product, and the latter, even after lying for a long time, may be quickly and completely dissolved in the appropriate solvents.

In consequence of the complete elimination, by my method, of all undesirable volatile and fluid constituents, I am not limited to the use of only phenol-formaldehyde condensation products in the production of artificial resin, but I may also employ tar, crude tar oils, crude methyl $CH_3OH$ and the like as the initial substances.

I claim:—

1. The herein described method of manufacturing artificial resin of the phenol-formaldehyde type, which consists in reacting the resin constituents in the presence of heat, cooling and settling the resulting product to form a liquid stratum and a partially dehydrated resin stratum, subjecting the resin stratum to cold centrifugal action, thereafter subjecting successive thin layers of the resin to rotation while supported on a heated surface, and finally subjecting said layers to rotation while supported on a cool surface.

2. The herein described method of manufacturing artificial resin of the phenol-formaldehyde type, which consists in reacting the resin constituents in the presence of heat, cooling and settling the resulting product to form a lower stratum of substantially dehydrated resin and an upper stratum of liquid, subjecting the resin to cold centrifugal action, thereafter imparting rapid motion to the resin in the presence of heat, then rapidly moving the resin in a cooling atmosphere, and finally forming the resin into desired shape.

3. The herein described method of manufacturing artificial resin of the phenol-formaldehyde type, which consists in reacting the resin constituents in the presence of heat, cooling and settling the resulting product to form a lower stratum of substantially dehydrated resin and an upper stratum of liquid, subjecting the resin to cold centrifugal action to eliminate the major portion of its liquid content, then subjecting successive thin layers of the resin to rotation while supported on a heated surface, thereafter subjecting said layers to rotation while supported on a cooled surface, and finally stripping said layers in sheet form from the last mentioned surface.

4. The herein described method of manufacturing artificial resin of the phenol-formaldehyde type, which consists in reacting the resin constituents in a closed container in the presence of heat, cooling and settling the resulting product to form a lower stratum of substantially dehydrated resin and an upper stratum of liquid containing a relatively small quantity of resin, extracting the resin from the liquid stratum, and subjecting said resin successively to cold centrifugal action, rapid rotation in the presence of heat and rapid rotation in a cooling atmosphere.

5. The herein described method of manufacturing artificial resin of the phenol-formaldehyde type, which consists in reacting the resin constituents in the presence of heat, cooling and settling the resulting product to form a lower stratum of substantially dehydrated resin and an upper stratum of liquid containing a relatively small quantity of resin, permitting the resin in the liquid to settle and combining the settled resin with that of the resin stratum, subjecting the entire body of resin to cold centrifugal action, then subjecting the resin to rotation in the presence of heat, and finally rotating the resin in a cooling atmosphere.

In testimony whereof I have affixed my signature.

CARL KULAS.